July 29, 1941.　　　E. E. TURNER, JR　　　2,250,509
RECORDING MECHANISM
Filed Oct. 2, 1937　　　2 Sheets-Sheet 1
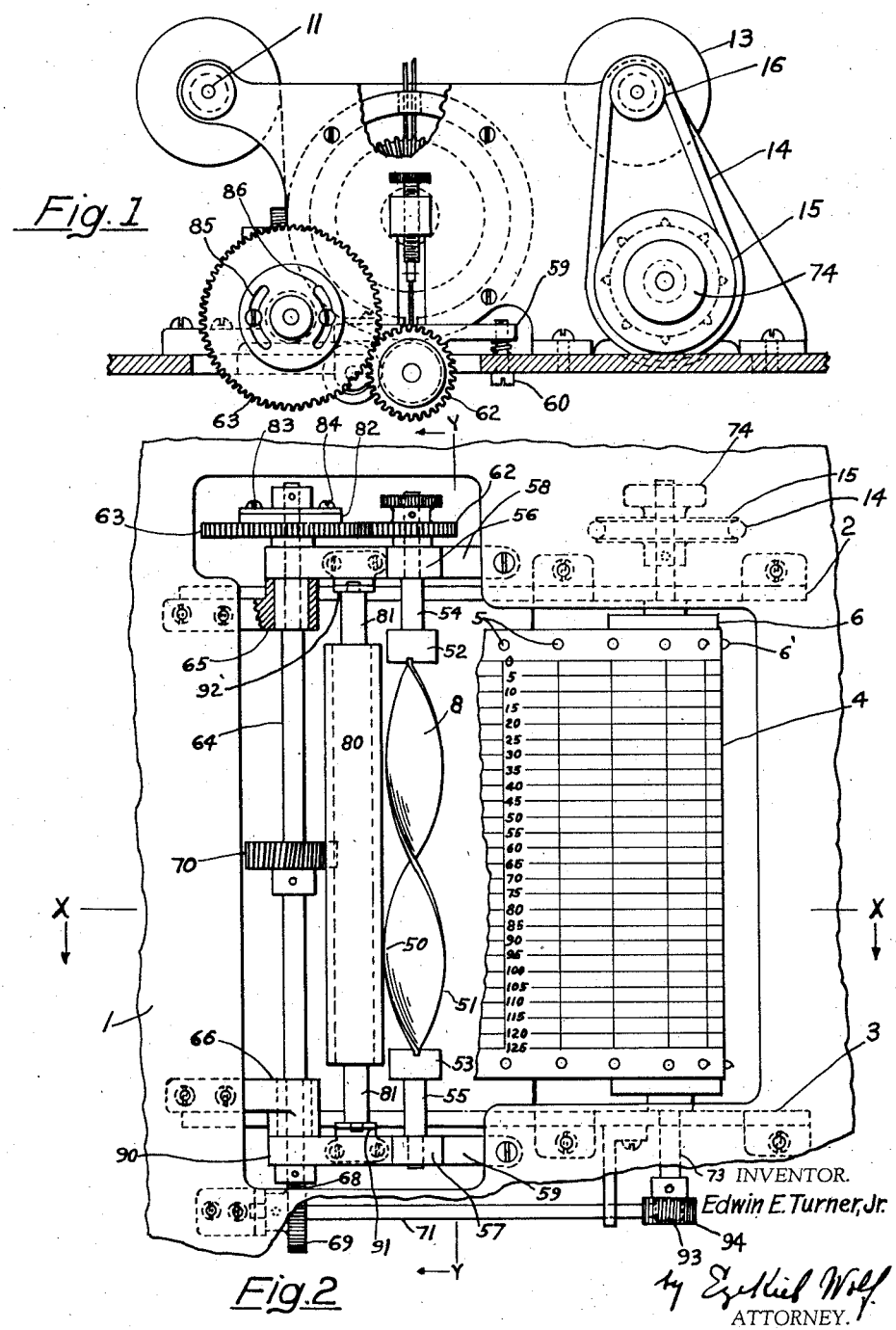

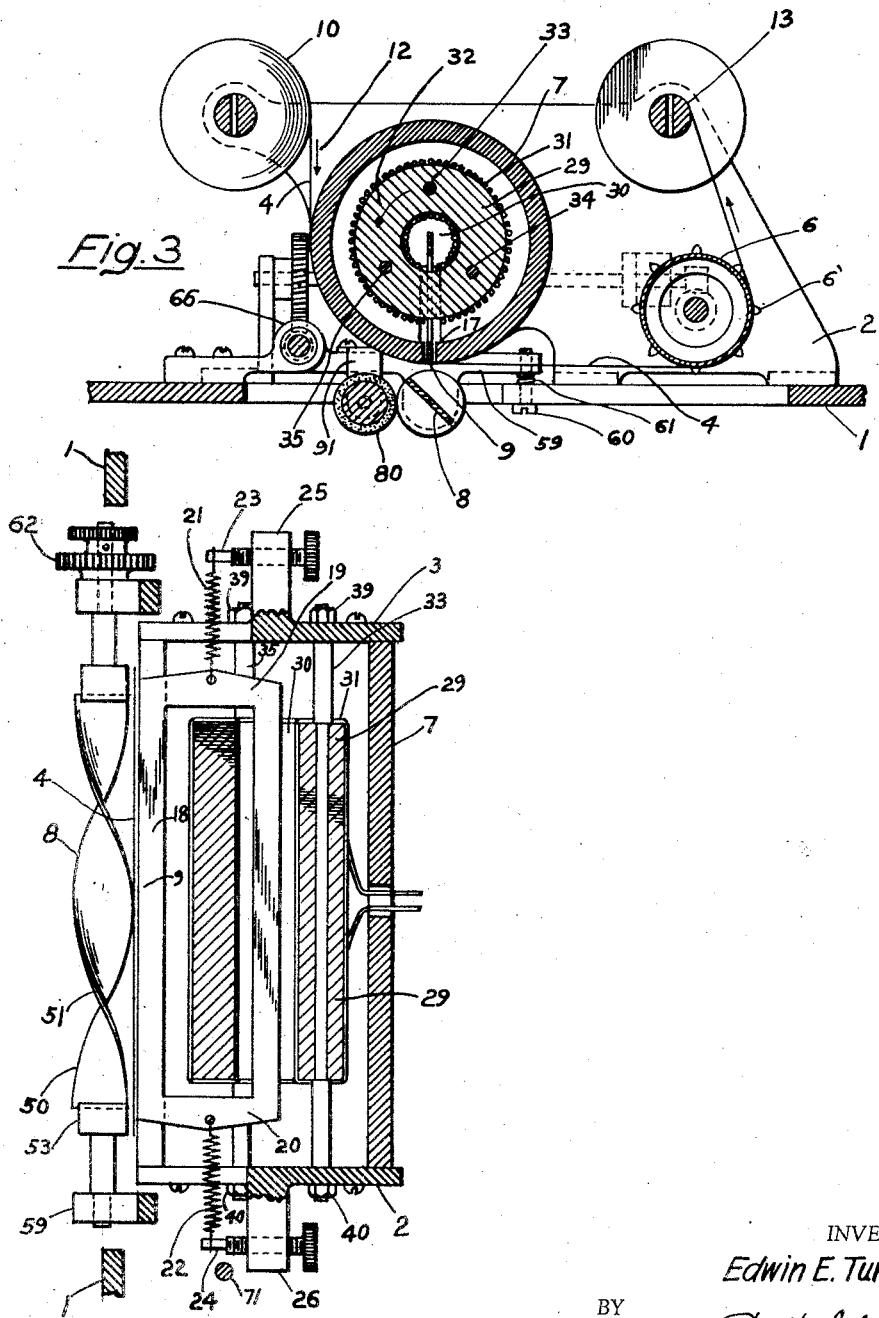

Patented July 29, 1941

2,250,509

UNITED STATES PATENT OFFICE 2,250,509

RECORDING MECHANISM

Edwin E. Turner, Jr., West Roxbury, Mass., assignor to Submarine Signal Company, Boston, Mass., a corporation of Maine Application October 2, 1937, Serial No. 166,960

4 Claims. (Cl. 234—70)

The present invention relates to a recording mechanism for producing a permanent record on a paper by means of a marking element.

The present invention is more particularly directed to recording the measurement of short-time intervals such as the time interval between the sending out of a signal in acoustic depth measurement and the receipt of an echo reflected from a distant object or a sea bottom wherein not only the time interval itself is very short, but also where the signal energy received is not always uniform or possessing sufficient power so that the power qualifications can be neglected or disregarded in the design of the apparatus.

The present invention overcomes the difficulties that exist in the applications to which the invention is applied. In the system to which the device is applied a signal is usually emitted at relatively the same point of the operation of the apparatus and a second signal indicating, in relation to the time interval between the two signals, the measure of distance or depth is marked upon a chart of paper or other suitable material, preferably by ink, to indicate the distance or depth measured. In the system of the present invention the signal is transmitted at very frequent intervals, in fact intervals at such frequency that the recorded echo produces marks successively close enough together to form a continuous line. In this system it follows from certain of these relationships that the recording paper moves slowly in comparison with the element which makes the mark.

In accomplishing the results in the present case the applicant has employed a helical blade in combination with a marking bar working respectively on opposite sides of the marking paper to produce a mark on the paper. The paper moves slowly between the blade and bar, the former being suitably inked so that as the bar which is thrust against the paper by the action of the incoming signal is operated, a mark is produced. The helical blade is preferably so designed that a straight line record transverse to the travel of the paper may be produced.

Further objects and advantages of the present invention in relation to the application for which it is used and in the construction of the apparatus will be understood from the specification below and the drawings illustrating the apparatus.

In the drawings Fig. 1 shows a side view of the apparatus with fragments removed to show detailed constructions; Fig. 2 shows a plan view of the arrangement shown in Fig. 1 as viewed from the bottom of Fig. 1; Fig. 3 shows a section taken on the line X—X of Fig. 2; and Fig. 4 shows a section taken on the line Y—Y of Fig. 2.

As indicated in the drawings a paper 4, which may be ruled off as shown in Fig. 2 with vertical and horizontal lines, the horizontal lines being marked to indicate the depth while the vertical lines indicate the actual time at which the record was made provided that the paper is moved at uniform speed and related in its calibrations to some time mechanism as, for instance, a clock or synchronous motor run from an alternating current source whose frequency is time controlled. The sheet 4 may be provided with holes 5 at its edges suitably placed to engage in the teeth 6' sprocket roll 6 so that the paper may be drawn by the sprocket roll over the lower face of the drum 7 and between the timing element 8 and the marking bar 9. The paper initially is supplied in a roll 10 mounted on a spindle 11 in the top corner of the plates 2 and 3 and moves as indicated by the arrow 12 in Fig. 3 downward under the drum 7 over the sprocket roll 6 and is rewound again upon the spindle 13 which is driven by the same driving source that drives the sprocket roll 6. This is indicated by the belt 14 and the pulleys 15 and 16 by means of which the roll 13 is driven.

The mechanism in the recorder device may for convenience in describing be divided into two parts; first, the marking mechanism, secondly, the mechanism for feeding and controlling the movement of the paper. The marking mechanism is shown in Figs. 3 and 4 in section and in part in Figs. 1 and 2.

The drum 7, as indicated in Fig. 3, is hollow and made of magnetic material so that the slot 17 which runs lengthwise thereof may be a magnetic air gap with magnetic flux flowing across it. The marking bar 9 is positioned in this slot and forms one side of a flat short-circuited transformer turn 18, as indicated, in the form of an elongated rectangular frame which is supported in the short cross sides 19 and 20 by means of the springs 21 and 22 which hook in holes in the middle of the side pieces. The springs are helical and are hung at their other end to rods 23 and 24, respectively, which are threaded to fit into the ears 25 and 26 extending from the plates 2 and 3. Within the drum 7 there is carried a core 29 of a tubular shape with a hole 30 in the center. This core is wound with a coil 31, as indicated in Figs. 3 and 4, so as to make the flux circulate as indicated by the arrow 32 in Fig. 3. The core is supported in space within the shell 7 by means of three rods 33, 34 and 35 which pass through the end plates 2 and 3 and are held in place to them by nuts 39 and 40.

The turn including the marking bar 9 is linked with the core 29 so that current passed through the coil 31 will induce current in the single turn 18 and cause current to flow lengthwise of the bar 9. The blade 9 is positioned in the slot 17 of the shell 7, and, as stated above, is a magnetic air gap formed because the shell is a permanent magnet. The turn 18, as has been mentioned above, is supported by the springs 21 and 22, the purpose of which is to allow the bar 9 free motion in a direction at right angles to the direction of the spring. Mounted opposite the edge of the bar 9 is the helical timing blade 9 which is rotated at a constantly uniform speed. The helical blade 8, as will be noted in Figs. 2 and 4, makes one complete turn. This helix, however, differs from the ordinary helix in that the back edge 51 is cut away so that only the edge 50 comes in contact with the paper as the high point of the helix sweeps by the paper. With the helix rotating at a constant speed, the high point of the edge 50 will sweep uniformly over the paper from the zero point to the deepest depth or calibration marked on the marking paper. As viewed in Fig. 2 this downward motion of the point of tangency of the helix and the paper is such as to produce a uniform or constant travel.

At the time that the signal is emitted the tangency of the edge 50 of the helix 8 is at zero and when the reflected echo is received and an indication produced so that the timing bar operates, the edge 50 of the helix will be at the correct depth as calibrated or read on the paper 4. When the echo wave or signal is received it is made to impress an impulse upon the coil 31 which induces a current in the single turn 18 and thereby produces a motion of the marking bar 9 to the left, as shown in Fig. 4. This brings the paper 4 in contact with the helical blade 8 at the point of its edge where the blade is tangent to the paper. As the blade is always inked, as will be presently explained, there is produced on the paper 4 a vertical mark in the position of the paper as shown in Fig. 2.

The helical blade 8 is mounted at its end in blocks 52 and 53 which are formed at the end of the shafts 54 and 55, respectively, forming as a whole a rigid rotating element with the shafts 54 and 55 aligned on the same axis. This rotating system is supported in bearings 56 and 57 extending from the bars or frames 58 and 59 which are adjustably mounted as indicated in Figs. 1, 2 and 3. The arms 58 and 59 have upwardly extending ears 60 formed as a part of the arms and journaled to allow the shaft 64 at each end to pass through the ears so that the bars 58 and 59 are pivoted on the shaft 64. The bars 58 and 59, as indicated in Fig. 3, are adjusted by means of the adjusting screws 60 which allows the bar 53 to be slightly raised or lowered against the tension of the spring 61 so that the proper contact may be made between the paper and the blade to allow the point of tangency of the blade 8 to travel across the paper as the blade is rotated.

The inking roller 80 is slightly smaller in diameter than the helical blade 8 but mounted in contact with it and journaled in bearings 91 and 92 mounted upon the bars 58 and 59 so that relatively the blade and inking roller will always have their axes in the same position. The diameter of the inking roller being slightly smaller than the blade, the blade will progressively contact over different surfaces of the inking roll and thereby consume the ink uniformly from the roll and not wear it in spots as it otherwise would.

The shaft 54 upon which the blade 8 is mounted is driven by the gear 62 which, in turn, is driven by the gear 63 on the shaft 64, also mounted in bearings 65 and 66 extending from the base 1. The shaft 64 is driven through the spur gear 70 which may be operated by a motor or any other driving system, the only limitation being that the speed of the driving source should be so controlled as to produce the desired uniform rotation of the marking blade 8 corresponding to the calibrations on the marking paper and to the use to which the recording device is put.

It will be noted that the adjustment of the helical blade 8 is on an arc concentric with the axis of the shaft 64 which is the driving shaft for the gear 63 so that as the gear 62 is moved with the adjustment of the arms 58 and 59 the same contact of the gears 62 and 63 will be preserved.

The shaft 64 also drives the means for advancing the paper. This is indicated in Fig. 2. The worm 68 on the shaft 64 drives the gear 69 which, in turn, drives the shaft 71. The shaft 73 upon which the roll 6 is mounted is driven through the gears 93 and 94. Also on the shaft 73 is mounted the pulley 15 and a hand knob 74 so that the roll 6 may be turned by hand if necessary. The pulley 15, as has been stated above, drives through the belt 14, the spindle 16 for winding up the paper as it leaves the spindle 6.

It should also be noted that the gear 63 for driving the marking blade 8 through the gear 62 is adjustable on the shaft 64 by means of the disc 82 pinned to the shaft 64 and carrying the set screws 83 and 84 working in the slots 85 and 86, respectively. The gear 63 may in this manner be rotated the angle of the arc of the slots 85 and 86 and be set in the desired position. In this manner the respective timing position of the blade 8 and the rest of the mechanism may be obtained. This is particularly necessary where the driving gear 70 is tied in to a control system as is usually the case to emit a sound signal at the proper time so that the scale on the marking paper as calibrated will record the proper depth.

Having now described my invention, I claim:

1. In a recording device of the type described, a drum having a slot therein, means for positioning a recording paper around said drum and over said slot, a toroidal magnet positioned within said drum, a conductive coil element linking said toroidal magnet and providing an edge aligned in said slot whereby when said toroidal magnet is momentarily energized, said conductive element will move radially in said slot against said paper.

2. In a recording device of the type described, a drum having a slot transversely positioned therein and forming a magnetic air gap, a toroidal electromagnet positioned within said drum, a conductive coil element linking said toroidal magnet and having one side thereof positioned within said slot, the said side providing a marking edge aligned with the outer surface of said drum and means for passing a record paper around said drum and over said slot and the edge of said element.

3. In a recording device of the type described, means for supporting a recording paper and means for marking the paper including a single-turn, electrodynamically operated, moving coil formed of a flat strip of conductive material wound edgewise, a portion of its outer edge forming a marking edge, means positioning said edge in operative relation to said paper and means for energizing said coil for motion in its plane against the paper when a mark is to be made.

4. In a recording device of the type described, means for supporting a recording paper and means for marking the paper including a single-turn conductive moving coil one side of which is formed to provide a marking edge, spring means freely suspending said coil with said edge in operative relation to said paper and means for actuating said coil by electrodynamic action when a mark is to be made.

EDWIN E. TURNER, Jr.